(12) United States Patent
Pokharkar et al.

(10) Patent No.: US 12,263,426 B2
(45) Date of Patent: *Apr. 1, 2025

(54) FUEL-WATER SEPARATOR SYSTEMS AND METHODS

(71) Applicant: Cummins Filtration IP, Inc., Columbus, IN (US)

(72) Inventors: Mrinmayee Balasaheb Pokharkar, Pune (IN); Nilesh Bhaskar Nagare, Thane (IN); Gregory D. Shope, Cookeville, TN (US); Bharath Siddaramanna Onkarappa, Shivamogga (IN); Brian M. Palmer, Cookeville, TN (US)

(73) Assignee: Cummins Filtration IP, Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/124,157

(22) Filed: Mar. 21, 2023

(65) Prior Publication Data

US 2023/0219023 A1 Jul. 13, 2023

Related U.S. Application Data

(63) Continuation of application No. 17/333,459, filed on May 28, 2021, now Pat. No. 11,623,169, which is a
(Continued)

(30) Foreign Application Priority Data

Jul. 12, 2017 (IN) .............................. 201741024558

(51) Int. Cl.
*B01D 17/04* (2006.01)
*B01D 36/00* (2006.01)
*F02M 37/26* (2019.01)

(52) U.S. Cl.
CPC ......... *B01D 36/005* (2013.01); *B01D 17/045* (2013.01); *B01D 36/001* (2013.01);
(Continued)

(58) Field of Classification Search
CPC ............ B01D 17/045; B01D 2201/291; B01D 2201/309; B01D 29/21; B01D 36/001; B01D 36/005; B01D 36/006; F02M 37/26
See application file for complete search history.

(56) References Cited

U.S. PATENT DOCUMENTS

| 3,809,244 A | 5/1974 | Jackson |
| 4,619,764 A | 10/1986 | Church et al. |

(Continued)

FOREIGN PATENT DOCUMENTS

| CN | 1551947 | 12/2004 |
| CN | 1834445 | 9/2006 |

(Continued)

OTHER PUBLICATIONS

Chinese Office Action and Search Report issued for Chinese Patent Application No. CN 201880039067.2 issued Apr. 2, 2021, with translations, 17 pages.
(Continued)

*Primary Examiner* — Terry K Cecil
(74) *Attorney, Agent, or Firm* — Foley & Lardner LLP

(57) ABSTRACT

A fuel-water separator includes a cartridge assembly and a bowl. The cartridge assembly receives a fuel-water mixture and provides a fuel. The cartridge assembly includes an endplate. The bowl is configured to store water separated from the fuel-water mixture. The bowl is coupled to the endplate. The endplate includes an air vent that receives air from the bowl. The air vent establishes a pressure equilibrium within the bowl and the cartridge assembly.

22 Claims, 10 Drawing Sheets

Related U.S. Application Data continuation of application No. 16/628,934, filed as application No. PCT/US2018/041425 on Jul. 10, 2018, now Pat. No. 11,077,393.

(52) U.S. Cl.
CPC ...... *B01D 36/006* (2013.01); *B01D 2201/291* (2013.01); *B01D 2201/309* (2013.01); *F02M 37/26* (2019.01)

(56) References Cited

U.S. PATENT DOCUMENTS

| | | | |
|---|---|---|---|
| 4,668,393 A | 5/1987 | Stone | |
| 4,692,245 A | 9/1987 | Church et al. | |
| 4,732,671 A | 3/1988 | Thornton et al. | |
| 4,740,299 A | 4/1988 | Popoff et al. | |
| 5,084,170 A | 1/1992 | Janik et al. | |
| 5,547,565 A | 8/1996 | Biere et al. | |
| 5,547,572 A | 8/1996 | Stone | |
| 5,843,313 A | 12/1998 | Bradford | |
| 5,997,739 A | 12/1999 | Clausen et al. | |
| 6,139,738 A | 10/2000 | Maxwell | |
| 11,077,393 B2 * | 8/2021 | Pokharkar | B01D 36/005 |
| 11,623,169 B2 * | 4/2023 | Pokharkar | B01D 36/005 210/85 |
| 2004/0164017 A1 | 8/2004 | Knight | |
| 2009/0065419 A1 | 3/2009 | Jiang | |
| 2011/0203982 A1 | 8/2011 | Braunheim | |
| 2011/0259808 A1 | 10/2011 | Oelschlaegel | |
| 2014/0208702 A1 | 7/2014 | Lundgren et al. | |
| 2015/0308393 A1 | 10/2015 | Boiger et al. | |
| 2016/0082370 A1 | 3/2016 | Morris et al. | |
| 2016/0222931 A1 | 8/2016 | Jiang et al. | |
| 2016/0258397 A1 | 9/2016 | Jiang et al. | |
| 2018/0161708 A1 | 6/2018 | Morris et al. | |

FOREIGN PATENT DOCUMENTS

| | | |
|---|---|---|
| CN | 102213136 | 10/2011 |
| CN | 102383974 | 3/2012 |
| CN | 102940998 | 2/2013 |
| CN | 204284619 | 4/2015 |
| CN | 105964011 | 9/2016 |
| CN | 105964012 | 9/2016 |
| DE | 10 2015 005 562 | 11/2015 |
| GB | 0 821 877 | 10/1959 |
| GB | 2 552 542 | 1/2018 |
| JP | 2013-249614 | 12/2013 |
| WO | WO-2017/030008 | 2/2017 |

OTHER PUBLICATIONS

International Search Report and Written Opinion issued for PCT/US2018/041425, issued Oct. 1, 2018, 7 pages.

Office Action issued for Chinese Patent Publication No. CN 202110928933.7 issued Nov. 30, 2022, 9 pages.

\* cited by examiner

FUEL-WATER SEPARATOR SYSTEMS AND METHODS

CROSS-REFERENCE TO RELATED PATENT APPLICATIONS

The present application is a continuation of U.S. patent application Ser. No. 17/333,459, filed May 28, 2021, which is a continuation of U.S. patent application Ser. No. 16/628,934, filed Jan. 6, 2020, now U.S. Pat. No. 11,077,393, which is a national stage of PCT Application No. PCT/US2018/041425, filed Jul. 10, 2018 which claims the benefit of priority to, Indian Provisional Patent Application No. 201741024558, filed Jul. 12, 2017,. The contents of these applications are incorporated herein by reference in their entirety.

TECHNICAL FIELD

The present application relates generally to the field of fuel-water separator systems.

BACKGROUND

For internal combustion engines, such as diesel engines, fuel systems may accumulate water entrained (e.g., mixed, etc.) within fuel that flows within the fuel system. To remove some of the water from the fuel, these fuel systems may incorporate fuel-water separators. Back-pressure of air within conventional fuel-water separators decreases the ability of conventional fuel-water separators to store water. A number of conventional fuel-water separators utilize a central vent within an internal volume in an attempt to address this issue. However, air above this central vent becomes trapped within the internal volume. As a result, such conventional fuel-water separators are unable to utilize the entire internal volume to store water.

SUMMARY

In an embodiment, a fuel-water separator includes a cartridge assembly and a bowl. The cartridge assembly receives a fuel-water mixture and provides a Fuel. The cartridge assembly includes an endplate. The bowl is configured to store water separated from the fuel-water mixture. The bowl is coupled to the endplate. The endplate includes an air vent that receives air from the bowl. The air vent establishes a pressure equilibrium within the bowl and the cartridge assembly.

In another embodiment, a fuel-water separator includes a cartridge assembly and a bowl. The cartridge assembly is configured to separate a fuel-water mixture. The cartridge assembly includes a coalescing tube and an endplate. The endplate includes an axial body and an air vent. The axial body is received within the coalescing tube. The air vent extends through the axial body and is in fluid communication with the coalescing tube. The howl is configured to store water separated from the fuel-water mixture. The bowl includes a central body coupled to the axial body.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for separator water from fuel within a fuel system. The various concepts introduced above and discussed in greater detail below may he implemented in any of numerous ways, as the described concepts are not limited to any particular manner of implementation. Examples of specific implementations and applications are provided primarily for illustrative purposes.

I. Example Fuel-Water Separator

Figure 1:
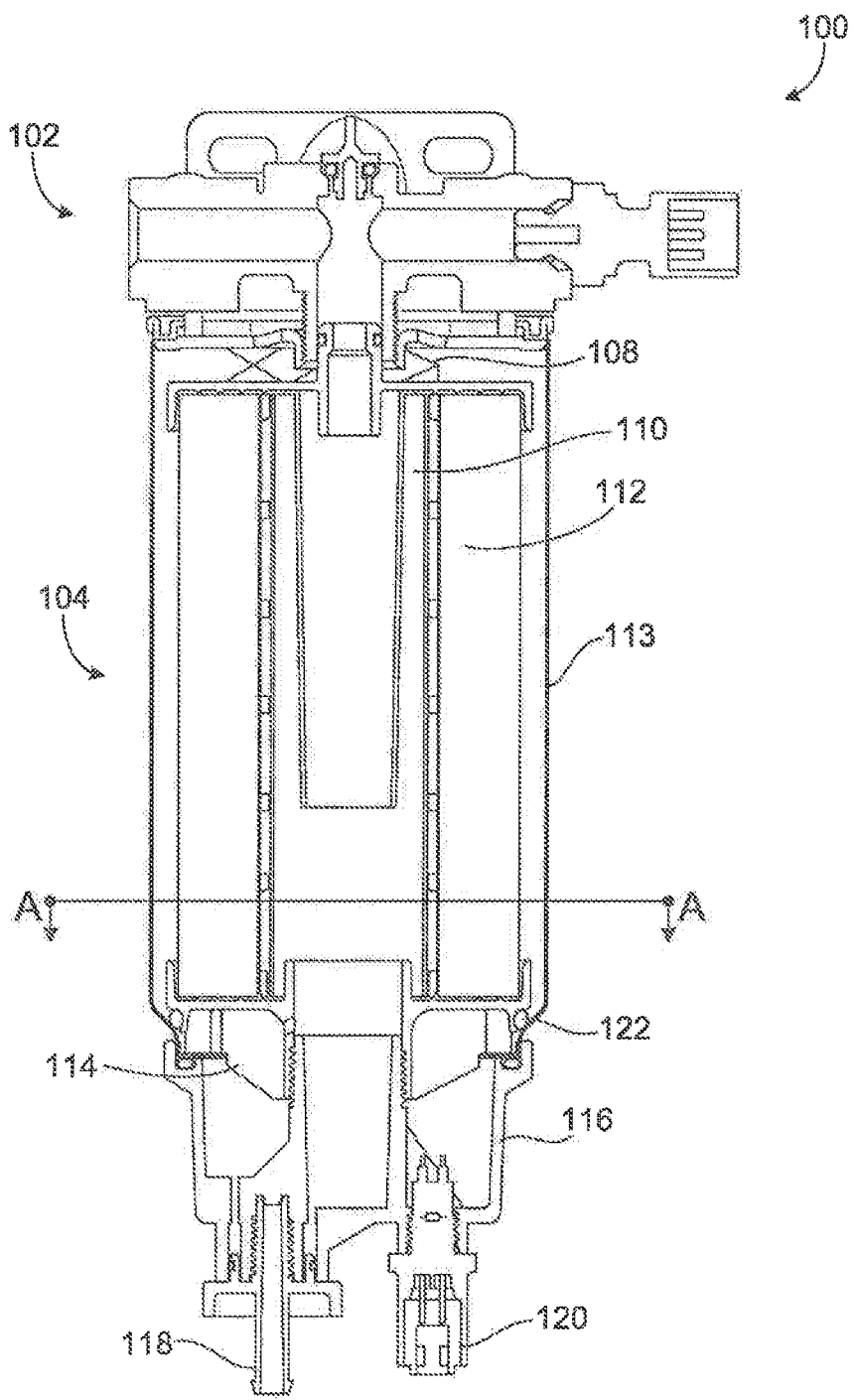
FIG. 1 is a cross-sectional view of an example fuel-water separator.
Figure 2:
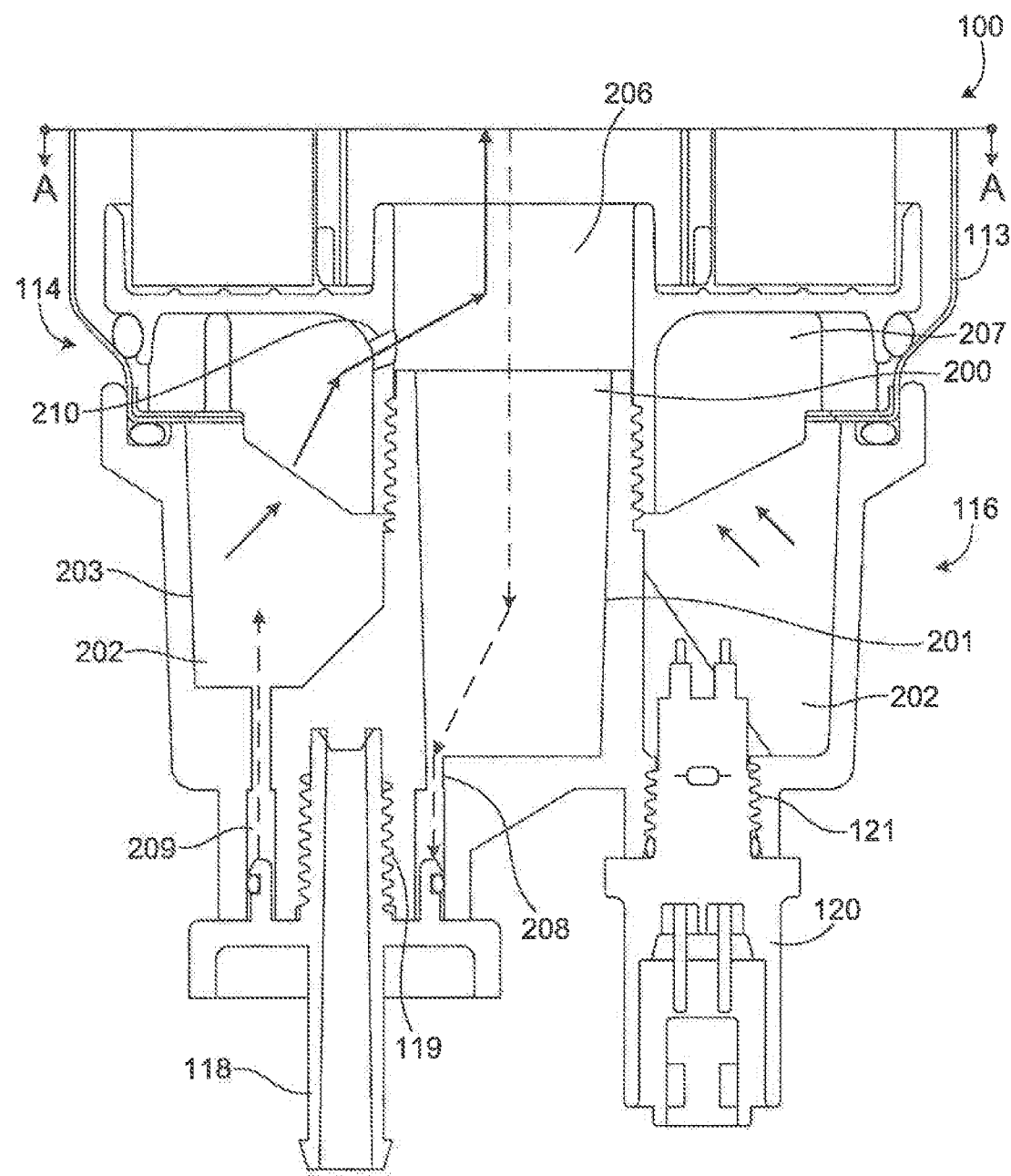
FIG. 2 is a detailed view of a portion of the fuel-water separator of FIG. 1, taken below line A-A in FIG. 1.

FIGS. 1 and 2 depict a fuel-water separator 100, according to an example embodiment. As will be described in more detail herein, the fuel-water separator 100 functions to separate water from fuel (e.g., diesel fuel, gasoline, petrol, ethanol, etc.) within a fuel system. The fuel-water separator 100 comprises a filter head assembly 102 and a cartridge assembly 104.

The filter head assembly 102 receives a fuel-water mixture from an upstream component (e.g., fuel tank, fuel pump, etc.) in the fuel system and provides fuel to a downstream component (e.g., fuel filter, fuel pump, fuel injector, etc.) in the fuel system. Further, the filter head assembly 102 provides the fuel-water mixture to the cartridge assembly 104 and receives the fuel (with water removed) from the cartridge assembly 104. The cartridge assembly 104 includes a coalescing tube 110 and a cartridge 112 positioned within a shell or housing 113. The coalescing tube 110 and the cartridge 112 cooperate to separate the fuel from the water. The fuel-water separator 100 also includes a biasing member 108 (e.g., a spring) positioned between the filter head assembly 102 and the cartridge assembly 104.

The cartridge assembly 104 includes an endplate 114. The endplate 114 forms a bottom end of the cartridge assembly 104. For example, the endplate 114 may be permanently attached (e.g., bonded via adhesive, bonded via polyurethane, etc.) to a portion (e.g., inner surface, etc.) of the cartridge assembly 104. The fuel-water separator 100 also includes a bowl 116 (e.g., a transparent or translucent bowl, etc.), a drain plug 118, and a sensor 120 (e,g., water-in-fuel sensor, etc.). The endplate 114, the bowl 116, and the drain plug 118 cooperate to drain water from the fuel-water separator 100. The sensor 120 functions to determine an amount (e.g., percentage, volume, etc.) of water in the bowl 116. The fuel-water separator 100 also includes a seal member 122 positioned between the endplate 114 and a portion of the cartridge assembly 104. For example, the seal member 122 (such as an o-ring) may be positioned between the housing 113 and the endplate 114. in an example manufacturing process, the seal member 122 is placed on the endplate 114, and then the endplate 114 is permanently attached to a portion of the cartridge. assembly 104.

The bowl 116 includes a central body 200. The central body 200 defines a central cavity 201. The bowl 116 also includes a circumferential body 202. In operation, the central body 200 receives water from the cartridge assembly 104 through an axial body 206 in the endplate 114. The endplate 114 also includes an annular body 207. The annular body 207 is coupled to the axial body 206 and is configured to interface with the cartridge 112, The annular body 207 and the circumferential body 202 define a circumferential cavity 203 therebetween. The central body 2.00 directs the water into an outlet channel 208 that is communicable with the central cavity 201 and provides the water to the drain plug 118. The drain plug 118 provides the water through the circumferential body 202 into the circumferential cavity 203 via an inlet channel 209. The circumferential body 202 provides the water to the sensor 120.

The circumferential body 202 includes a drain plug aperture 119 and a sensor aperture 121. The drain plug aperture 119 is configured to receive the drain plug 118, and the sensor aperture 121 is configured to receive the sensor 120, In various embodiments, the drain plug 118 is configured to be threaded into the drain plug aperture 119, and the sensor 120 is configured to be threaded into the sensor aperture 121.

Air also accumulates within the circumferential body 202. The air is provided from the circumferential cavity 203 through an air vent 210 (e.g., a vent hole, etc.) in the endplate 114 and into the axial body 206. Because the air vent 210 is integrated within the endplate 114, the overall number of components associated with the fuel-water separator 100 is decreased. This provides cost-savings compared to conventional separators which utilize numerous components.

From the axial body 206, the air is provided into the cartridge assembly 104 such that back-pressure within the bowl 116 is eliminated or substantially mitigated. Through the use of the air vent 210. a capacity of the bowl 116 to collect and store water is increased, thereby increasing the desirability of the fuel-water separator 100. In FIG. 2, the trajectory of air is shown in solid arrows while the trajectory of water is shown in dashed arrows.

The endplate 114 serves a number of distinct purposes. First, the endplate 114. receives substantially all (e.g., at least 95%, etc.) of the air from the bowl 116 and provides substantially all (e.g., at least 95%, etc.) of the air into the cartridge assembly 104, thereby increasing the amount of water that can be collected in the howl 116 (e.g., from the outlet channel 208, the drain plug 118, and the inlet channel 209, etc.). Second, the endplate 114 permanently couples the bowl 116 to the cartridge assembly 104. Because the endplate 114 permanently couples the bowl 116 to the cartridge assembly 104, the need for a separator adaptor is eliminated and the overall number of components associated with the fuel-water separator 100 is decreased. This provides cost-savings compared to conventional separators which utilize numerous components. Additionally, this arrangement of the bowl 116 facilitates emptying of the bowl 116 because the air vent 210 is open towards a clean side (e.g., top side, etc.) of the cartridge 112, thereby facilitating venting of air from the howl 116. Third, the endplate 114 provides a permanent sealing interface between the bowl 116 and the cartridge assembly 104, thereby preventing leakage of water therebetween.

Figure 3:
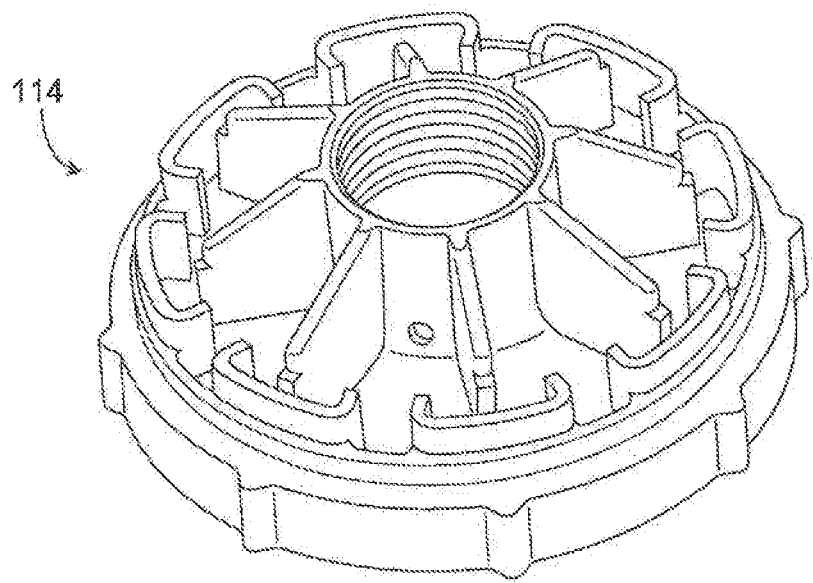
FIG. 3 is a bottom perspective view of an example endplate for a fuel--water separator, such as the example fuel-water separator shown in FIG. 1.
Figure 4:
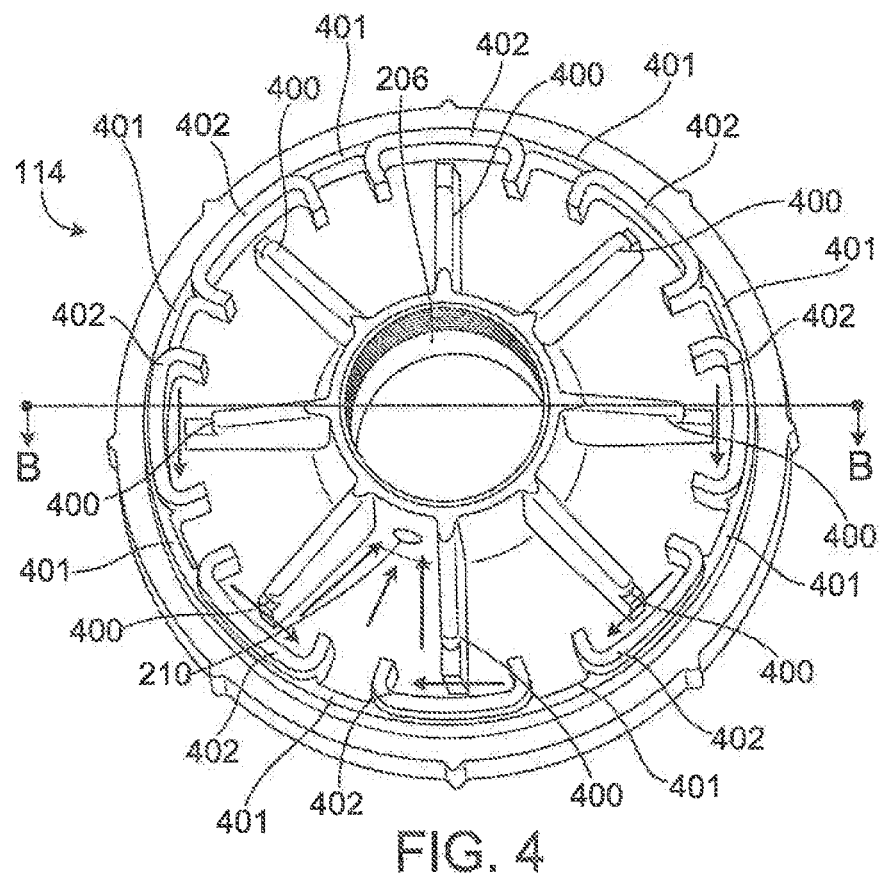
FIG. 4 is a bottom view of the example endplate shown in FIG. 3.
Figure 5:
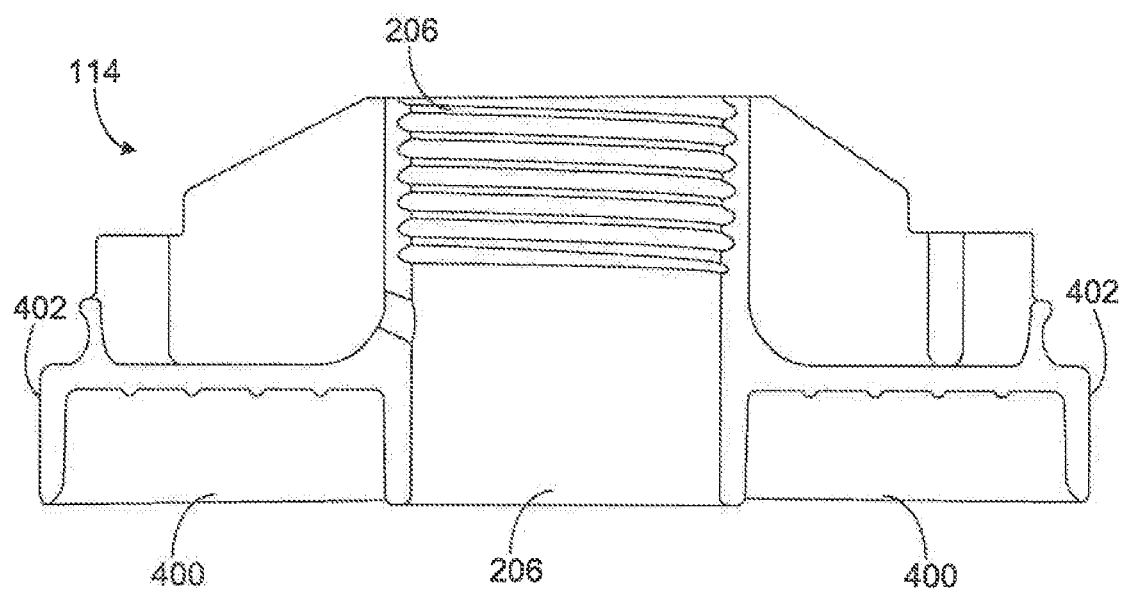
FIG. 5 is a cross-sectional view of the example endplate shown in FIG. 4, taken about line B-B.
Figure 6:
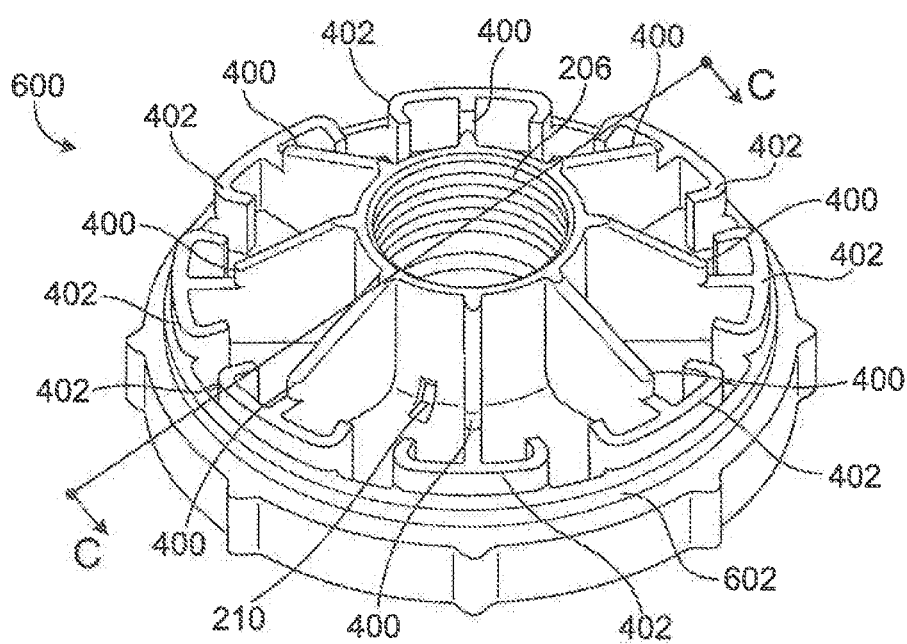
FIG. 6 is a bottom perspective view of another example endplate for a fuel-water separator, such as the example fuel-water separator shown in FIG. 1.
Figure 7:
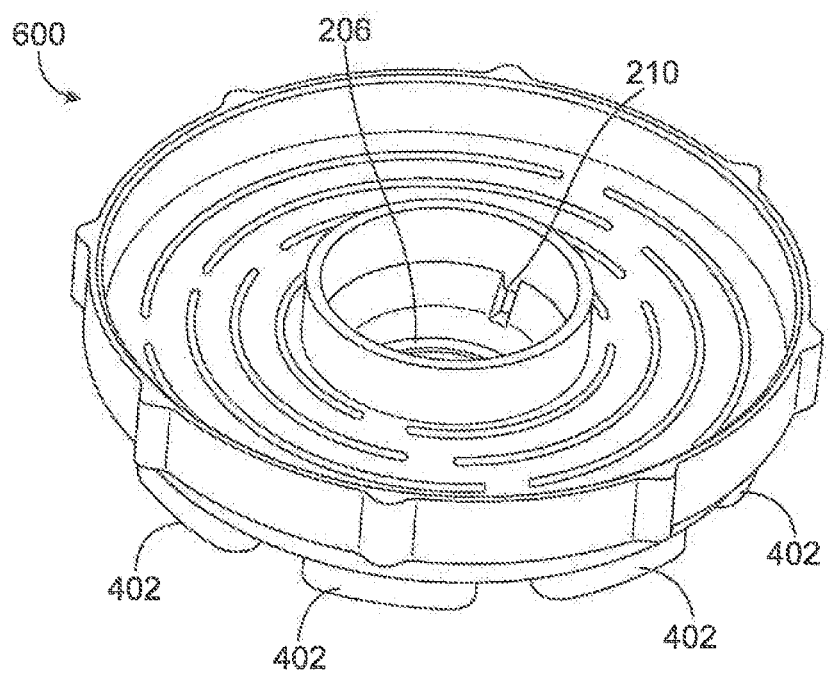
FIG. 7 is a top perspective view of the example endplate shown in FIG. 6.
Figure 8:
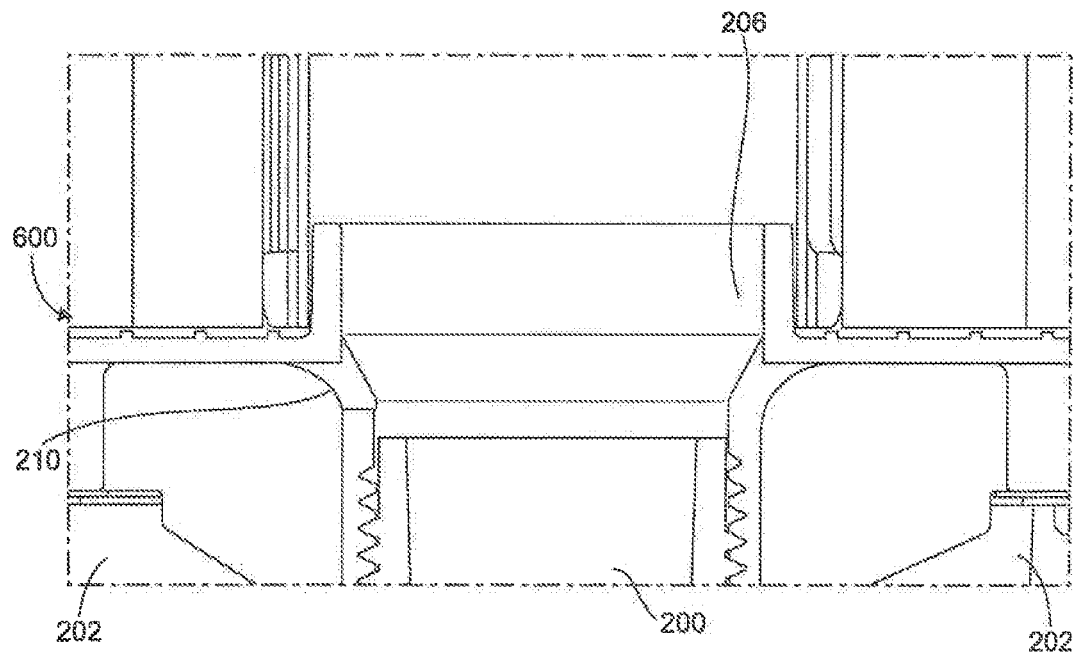
FIG. 8 is a cross-sectional view of the example endplate shown in FIG. 6, taken about line C-C.
Figure 9:
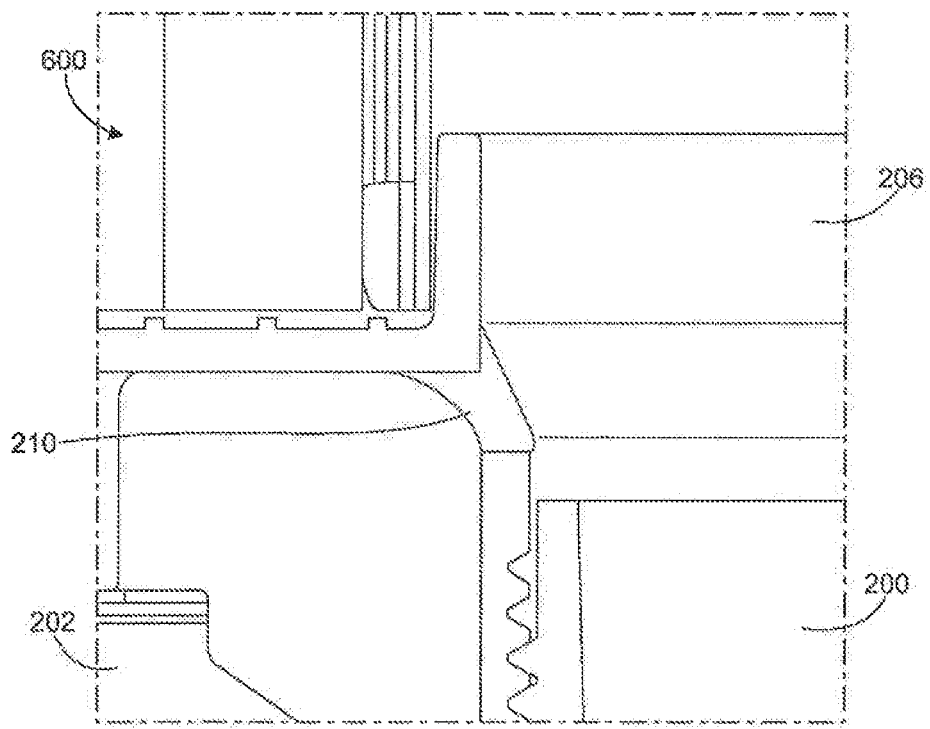
FIG. 9 is a detailed view of a portion of FIG. 8.

FIGS. 3-5 illustrate an example endplate 114 in greater detail. The endplate 114 includes a plurality of radial ribs 400, a plurality of circumferential wall segments 401, and a plurality of circumferential ribs 402. Each of the circumferential wall segments 401 is coupled to an adjacent pair of the circumferential ribs 402 such that adjacent pairs of the circumferential ribs 402 are interspaced by a circumferential wall segment 401. The circumferential wall segments 401 and the circumferential ribs 402 cooperate to form a circumferential wall around the axial body 206, thereby defining a circumferential cavity therebetween. The number of radial ribs 400 is equal to the number of circumferential ribs 402. The radial ribs 400 extend from the axial body 206 and are each centered on one of the plurality of circumferential ribs 402. The circumferential ribs 402 are positioned about a periphery of one side of the endplate 114, Each of the circumferential ribs 402 is positioned about one of the radial ribs 400, such that each radial rib 400 is associated with a single circumferential rib 402. Because of this configuration, and the relative circumferential length of the circumferential ribs 402, pockets (e.g., cavities, voids, etc.) are formed between adjacent radial ribs 400.

A gap is formed between each radial rib 400 and the associated circumferential rib 402. The air flows between these gaps and into the air vent 210 such that air is directed towards the air vent 2.10 from three-hundred and sixty degrees relative to the axial body 206. As shown in FIG. 5, the air vent 210 is angled relative to the axial body 206. in this way, the air vent 210 can be constructed by inserting an angular core into the endplate 114.

FIGS. 6-9 illustrate an endplate 600 according to another example embodiment. The endplate 600 is similar to the endplate 114 as described herein. In this embodiment, the endplate 600 is manufactured using two cores, one positioned within the axial body 206, and another positioned between the axial body 206 and the circumferential ribs 402. In this way, the endplate 600 may be manufactured by cross-over shutoff. Rather than including the plurality of circumferential wall segments 401, the endplate 600 includes a continuous circumferential wall 602. The continuous circumferential wall 602 extends around each of the plurality of circumferential ribs 402. Each of the plurality of circumferential ribs 402 is coupled to the continuous circumferential wall 602.

Figure 10:
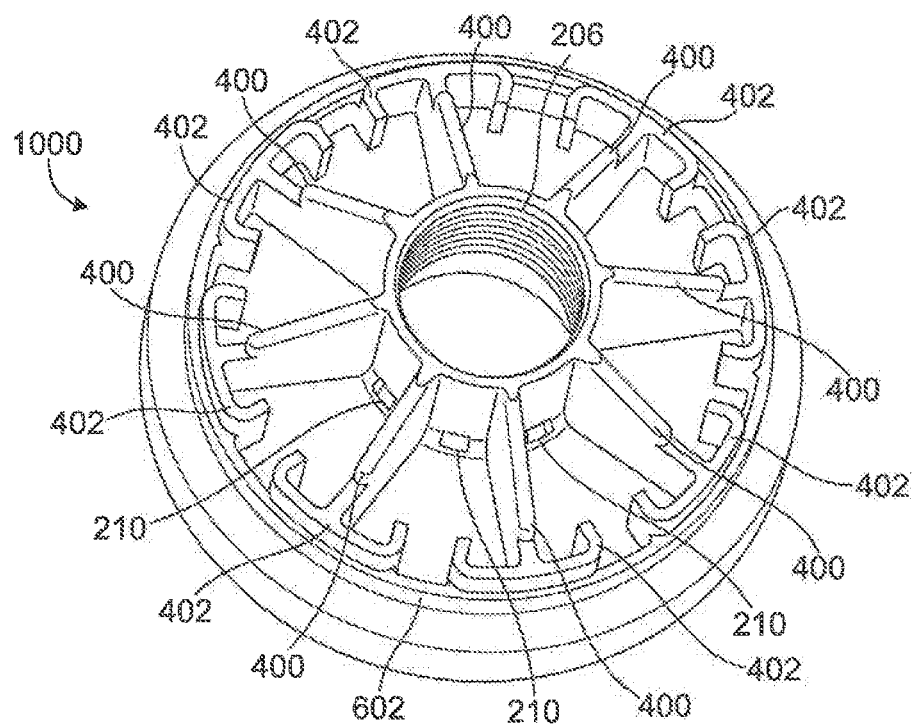
FIG. 10 is a bottom perspective view of yet another example endplate for a fuel-water separator, such as the example fuel-water separator shown in FIG. 1.
Figure 11:
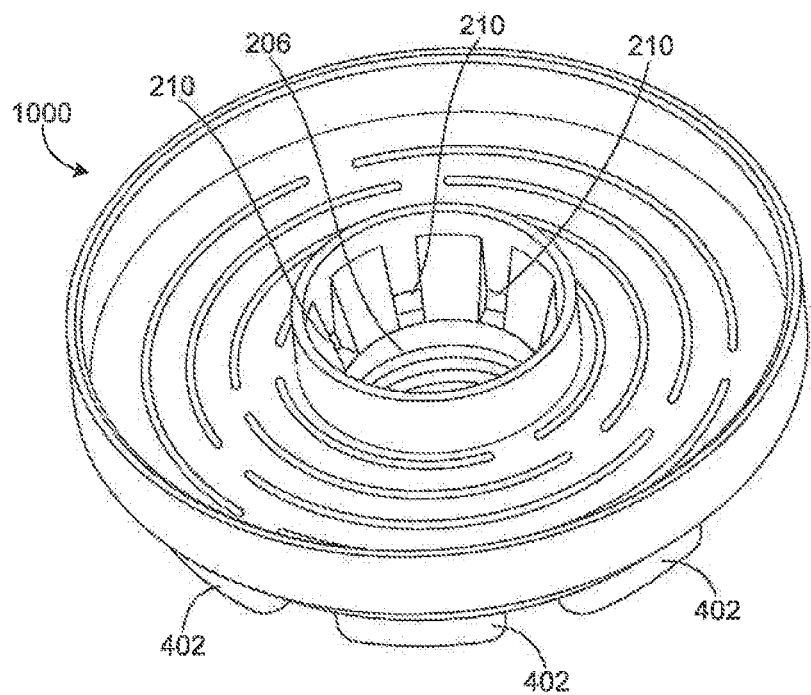
FIG. 11 is a top perspective view of the example endplate shown in FIG. 6.

FIGS. 10 and 11 illustrate an endplate 1000 according to yet another example embodiment. The endplate 1000 is similar to the endplate 114 as described herein. In this embodiment, the endplate 1000 includes multiple air vents 210, and each of the radial ribs 400 is integrated within one of the circumferential ribs 402 such that no gap exists between each pair of radial ribs 400 and circumferential ribs 402. Each of the air vents 210 is positioned along the axial body 206 between adjacent radial ribs 400. For example, the endplate 1000 may include eight air vents 210, eight radial ribs 400, and eight circumferential ribs 402. Similar to the endplate 600 illustrated in FIGS. 6-9, the endplate 1000 illustrated in FIGS. 10 and 11 may be manufactured by cross-over shutoff.

Figure 14:
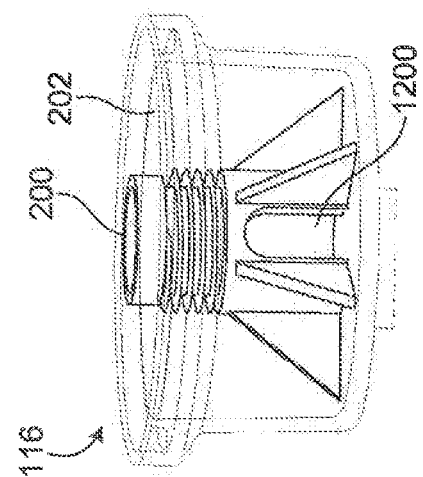
FIG. 14 is another top perspective view of the example bowl shown in FIG. 12, with certain portions shown as translucent for illustrative purposes only.
Figure 13:
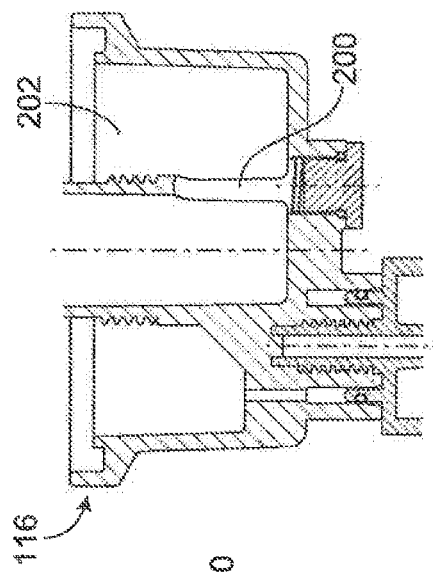
FIG. 13 is a cross-sectional view of the example bowl shown in FIG. 12, taken about line D-D.
Figure 12:
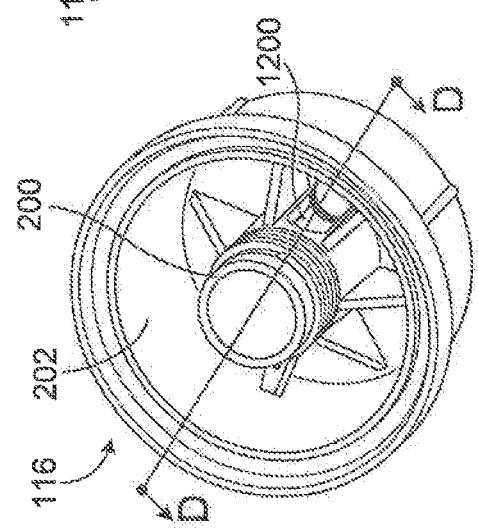
FIG. 12 is a top perspective view of an example bowl for a fuel-water separator, such as the example fuel-water separator shown in FIG. 1.

FIGS. 12-14 illustrate the bowl 116 according to an example embodiment. The bowl 116 includes a slot 1200 positioned along the central body 200 such that air and fuel and/or water may travel between the central body 200 and the circumferential body 202 via the slot 1200. Specifically, fuel and/or water flows from the central body 200 into the circumferential body 202 via the slot 1200, and air flows from the circumferential body 202 into the central body 200 via the slot 1200.

Upon initial startup on an internal combustion engine associated with the fuel-water separator 100, air is contained within the bowl 116. As fuel and/or water enters the bowl 116 enters the bowl 116 through the central body 200, any air trapped in the bowl 116 is evacuated through the slot 1200. The bowl 116 shown in FIGS. 12-14 continues to utilize the endplate 114, including the air vent 210, as previously described. In this way, when the level of fuel and/or water within the bowl 116 rises, air can also be evacuated via the air vents 210.

Figure 15:
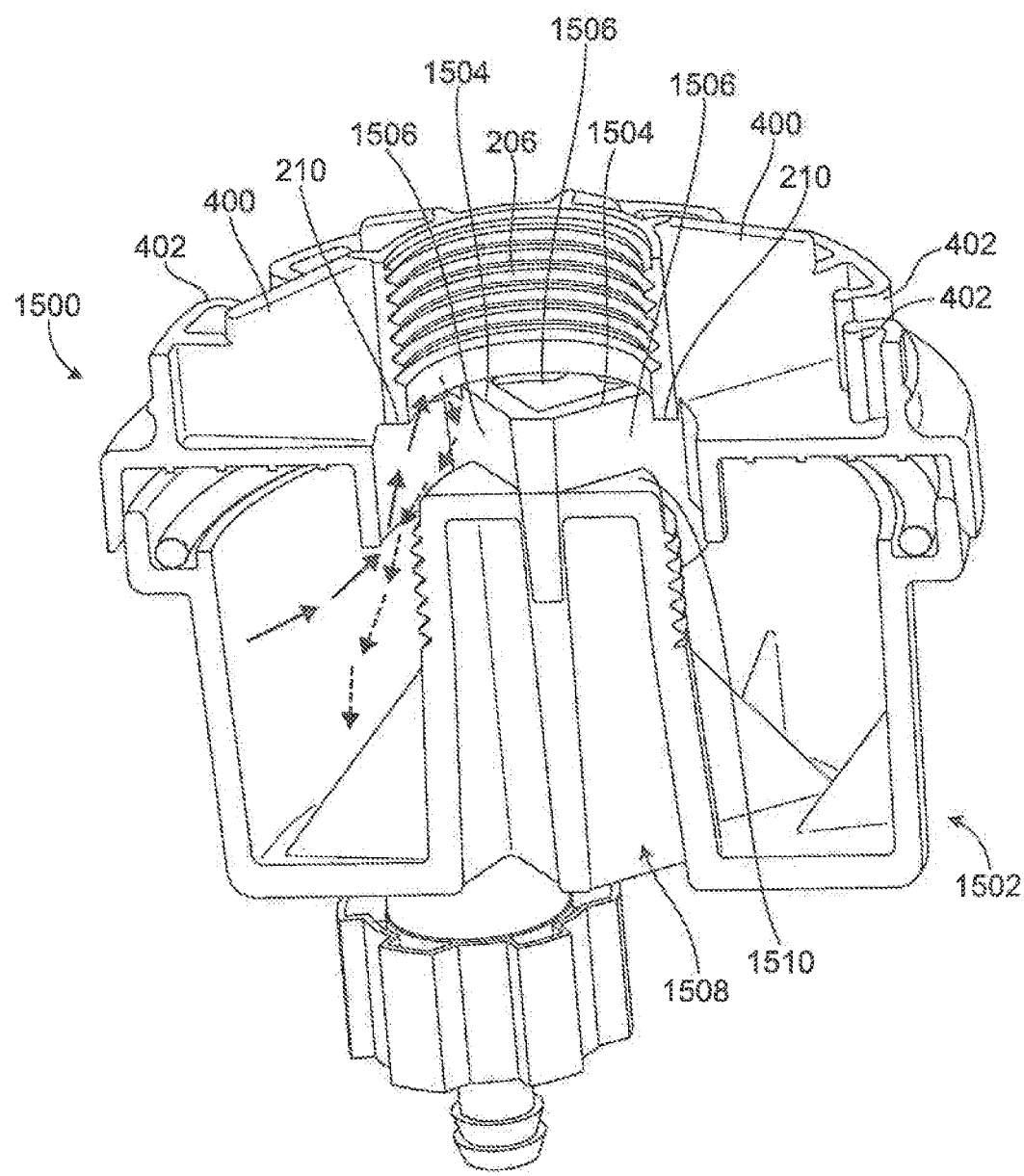
FIG. 15 is a cross-sectional view an example bowl for a fuel-water separator, such as the example fuel-water separator shown in FIG. 1.
Figure 16:
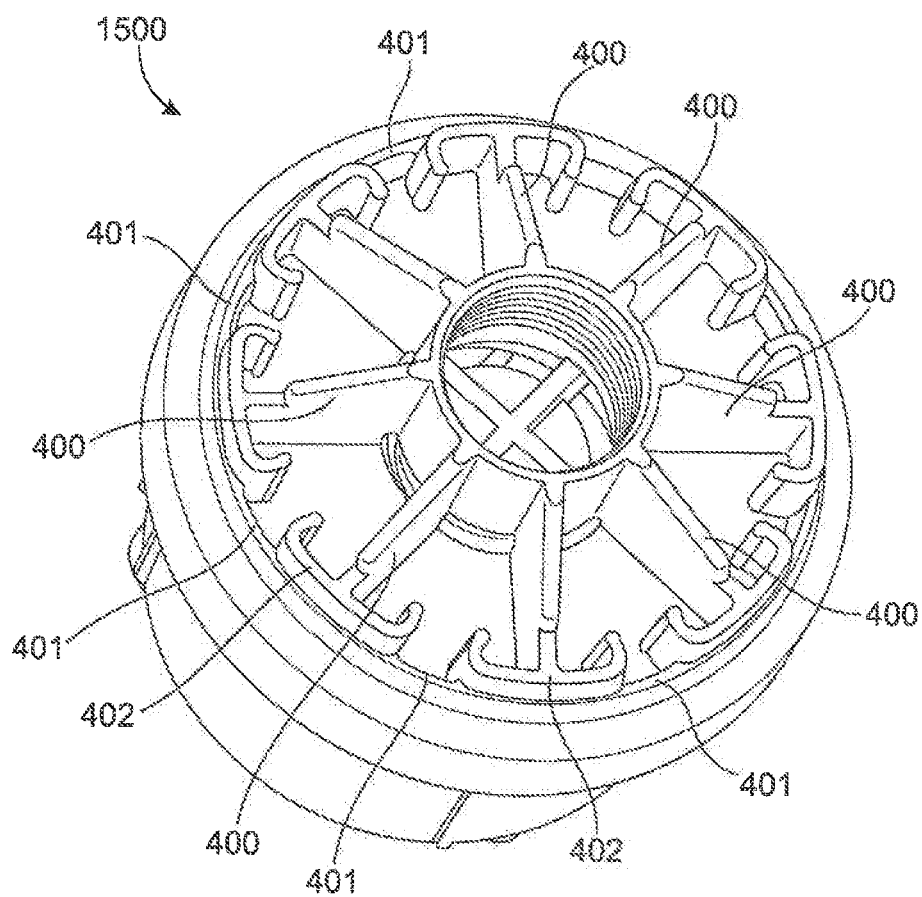
FIG. 16 is a top perspective view of the example bowl shown in FIG. 15.

FIGS. 15 and 16 illustrate an endplate 1500 and a bowl 1502 according to another example embodiment. The endplate 1500 is similar to the endplate 114 as described herein. The bowl 1502 is similar to the bowl 116 as described herein. It is understood that the endplate 1500 and the bowl 1502 are configured to be coupled together and utilized in a fuel-water separator similar to the fuel water separator 100 as described herein.

The endplate 1500 includes a plurality of radial ribs 400, a plurality of circumferential wall segments 401, and a plurality of circumferential ribs 402 as well as a plurality of air vents 210, Unlike the other endplates described herein, the endplate 1500 includes a plurality of interior ribs 1.504 positioned within the axial body 206. The plurality of interior ribs 1504 define a plurality of flow channels 1506, each of the plurality of flow channels 1506 located between adjacent interior ribs 1504. Each of the plurality of flow channels 1506 is in fluid communication with one of the plurality of air vents 210 such that the air and water from the bowl 1502 flow through at least one of the plurality of air vents 210, into at least one of the plurality of flow channels 1506, and into the axial body 206.

Rather than including the central cavity 201, the bowl 1502 includes a central protrusion 1508. The central protrusion 1508 does not store air or water, and instead is configured to be received within the axial body 206 such that a central face 1510 of the central protrusion 1508 contacts the plurality of interior ribs 1504. In an example embodiment, each of the plurality of air vents 210 is not formed as an aperture in the endplate 1500. Instead, each of the plurality of air vents 210 is defined by the shape of the axial body 206 and the central protrusion 1508.

The endplate 1500 and the bowl 1502 cooperate to store air and water in the bowl 1502 and to route air and water from the bowl 1502 into the endplate 1500 through the plurality of air vents 210 and the plurality of flow channels 1506. Air is carried upward through the endplate 1500 and into the coalescing tube 110 and/or the cartridge 112. Water, however, is substantially maintained in the endplate 1500 and/or the bowl 1502 due to the weight of the water. Specifically, the water drains from the endplate 1500 into the bowl 1502 via the plurality of flow channels 1506 and the air vents 210. In this way, while some water may be carried with the air through the air vents 210 and the flow channels 1506, the fuel water separator is configured such that the water is directed back into the bowl 1502 where it can be drained.

II. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled" and the like, as used herein, mean the joining of two components directly or indirectly to one another. Such joining may be stationary (e.g., permanent; or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item, unless specifically stated to the contrary.

What is claimed is:

1. A cartridge assembly for a fuel-water separator, the cartridge assembly comprising:
    a cartridge having an end; and
    an endplate interfacing with the end, the endplate comprising:
        a top side,
        a bottom side,
        an axial body,
        a first radial rib extending radially from the axial body along the bottom side,
        a second radial rib extending radially from the axial body along the bottom side,
        an air vent extending through the axial body between the first radial rib and the second radial rib, and
        a first circumferential rib including a first portion that extends circumferentially along the bottom side, the first portion radially separated from the first radial rib, the first portion cooperating with the axial body, the first radial rib, and the second radial rib so to provide a first flow path to the air vent.

2. The cartridge assembly of claim 1, wherein:
    the endplate further comprises a third radial rib extending radially from the axial body along the bottom side;
    the first radial rib extends between the third radial rib and the air vent; and
    the first flow path is communicable with a region between the first radial rib and the third radial rib.

3. The cartridge assembly of claim 1, wherein the endplate further comprises a second circumferential rib including a second portion that extends circumferentially along the bottom side, the second portion radially separated from the second radial rib, the second portion cooperating with the axial body, the second radial rib, and the second radial rib so to provide a second flow path to the air vent.

4. The cartridge assembly of claim 1, wherein the cartridge assembly further comprises a coalescing tube, and the axial body is received within the coalescing tube.

5. The cartridge assembly of claim 1, wherein:
    the air vent extends through the axial body in a generally radial direction; and
    the endplate is permanently attached to the end.

6. A cartridge assembly for a fuel-water separator, the cartridge assembly comprising:
    a cartridge having an end; and
    an endplate interfacing with the end, the endplate comprising:
        a top side,
        a bottom side,
        an axial body,
        a first radial rib extending radially from the axial body along the bottom side,
        a second radial rib extending radially from the axial body along the bottom side,
        a first air vent extending through the axial body between the first radial rib and the second radial rib, and
        a first circumferential rib coupled to the first radial rib, the first circumferential rib including a first portion extending towards the second radial rib.

7. The cartridge assembly of claim 6, wherein:
    the endplate further comprises:
        a third radial rib extending radially from the axial body along the bottom side; and
        a second air vent extending through the axial body between the second radial rib and the third radial rib;
    the first radial rib extends between the third radial rib and the first air vent; and
    the second radial rib extends between the first radial rib and the second air vent.

8. The cartridge assembly of claim 6, wherein the endplate further comprises a second circumferential rib coupled to the second radial rib, the second circumferential rib including a second portion extending towards the first radial rib.

9. The cartridge assembly of claim 8, wherein:
    the endplate further comprises a circumferential wall segment coupled to the first circumferential rib and the second circumferential rib; and
    a portion of the bottom side is bordered by the axial body, the first radial rib, the first circumferential rib, the second radial rib, the second circumferential rib, and the circumferential wall segment.

10. The cartridge assembly of claim 6, wherein the first air vent extends through the axial body in a generally radial direction.

11. The cartridge assembly of claim 6, wherein the first radial rib is centered on the first circumferential rib.

12. The cartridge assembly of claim 6, wherein the first circumferential rib includes a second portion contiguous with the first portion, the second portion extending towards the axial body.

13. A cartridge assembly for a fuel-water separator, the cartridge assembly comprising:
    a cartridge; and
    an endplate interfacing with the cartridge, the endplate comprising:
        a top side,
        a bottom side,
        an axial body,
        a first radial rib extending radially from the axial body along the bottom side,
        a second radial rib extending radially from the axial body along the bottom side,
        a first circumferential rib, the first circumferential rib comprising:
            a first portion extending circumferentially along the bottom side and aligned with the first radial rib, and
            a second portion extending towards the axial body and separated from the first radial rib, the second portion radially separated from the axial body, and
        a second circumferential rib comprising:
            a third portion extending circumferentially along the bottom side and aligned with the second radial rib, and
            a fourth portion extending towards the axial body and separated from the second radial rib, the fourth portion radially separated from the axial body.

14. The cartridge assembly of claim 13, wherein the first circumferential rib is contiguous with the first portion.

15. The cartridge assembly of claim 13, wherein:
    the endplate further comprises an air vent extending through the axial body; and
    the first radial rib is disposed between the air vent and the second radial rib.

16. The cartridge assembly of claim 15, wherein the air vent extends through the axial body in a generally radial direction.

17. The cartridge assembly of claim 15, wherein the first radial rib is radially separated from the first portion.

18. The cartridge assembly of claim 13, wherein:
the endplate further comprises a circumferential wall segment coupled to the first circumferential rib and the second circumferential rib; and
a portion of the bottom side is bordered by the axial body, the first radial rib, the first circumferential rib, the second radial rib, the second circumferential rib, and the circumferential wall segment.

19. The cartridge assembly of claim 13, wherein the first radial rib is centered on the first circumferential rib.

20. The cartridge assembly of claim 19, wherein the second radial rib is centered on the second circumferential rib.

21. A cartridge assembly for a fuel-water separator, the cartridge assembly comprising:
a cartridge; and
an endplate interfacing with the cartridge, the endplate comprising:
a top side,
a bottom side,
an axial body,
an air vent extending through the axial body,
a first radial rib extending radially from the axial body along the bottom side,
a second radial rib extending radially from the axial body along the bottom side,
a first circumferential rib, the first circumferential rib comprising:
a first portion extending circumferentially along the bottom side and aligned with the first radial rib, and
a second portion extending towards the axial body and separated from the first radial rib, and
a second circumferential rib comprising:
a third portion extending circumferentially along the bottom side and aligned with the second radial rib, and
a fourth portion extending towards the axial body and separated from the second radial rib;
wherein the first radial rib is disposed between the air vent and the second radial rib.

22. The cartridge assembly of claim 21, wherein the air vent extends through the axial body in a generally radial direction.

* * * * *